US007392686B2

(12) United States Patent
Woo et al.

(10) Patent No.: US 7,392,686 B2
(45) Date of Patent: Jul. 1, 2008

(54) CALIBRATION APPARATUS FOR VACUUM GAUGE HAVING COMBINED USE OF 1 TORR LEVEL, 10 TORR LEVEL, AND 100 TORR LEVEL

(75) Inventors: Sam Yong Woo, Daejeon (KR); In Mook Choi, Daejeon (KR); Boo Shik Kim, Daejeon (KR)

(73) Assignee: Korea Research Institute of Standards and Science (KR)

( * ) Notice: Subject to any disclaimer, the term of this patent is extended or adjusted under 35 U.S.C. 154(b) by 274 days.

(21) Appl. No.: 11/300,625

(22) Filed: Dec. 14, 2005

(65) Prior Publication Data

US 2006/0288758 A1 Dec. 28, 2006

(30) Foreign Application Priority Data

Jun. 24, 2005 (KR) .................. 10-2005-0055185

(51) Int. Cl.
*G01L 27/00* (2006.01)
(52) U.S. Cl. .......................... 73/1.58; 73/1.65
(58) Field of Classification Search .............. 73/1.58, 73/1.65
See application file for complete search history.

(56) References Cited

U.S. PATENT DOCUMENTS

| 2,719,431 | A | * | 10/1955 | Grant | 73/744 |
|---|---|---|---|---|---|
| 3,028,745 | A | * | 4/1962 | Muires | 73/1.65 |
| 3,464,256 | A | * | 9/1969 | Lloyd | 73/744 |
| 3,956,939 | A | * | 5/1976 | Bonk et al. | 73/744 |
| 4,604,891 | A | * | 8/1986 | Sgourakes et al. | 73/1.69 |
| 4,658,829 | A | * | 4/1987 | Wallace | 600/488 |
| 5,331,838 | A | * | 7/1994 | Delajoud | 73/1.65 |

* cited by examiner

*Primary Examiner*—Robert R Raevis
(74) *Attorney, Agent, or Firm*—Akerman Senterfitt

(57) ABSTRACT

Disclosed herein is a calibration apparatus for vacuum gauge having a combined use for an 1 Torr level, a 10 Torr level, and a 100 Torr level vacuum gauge. According to the present invention, there is provided a calibration apparatus for vacuum gauge, in which a standard pressure gauge 140, 142 is installed within a pressure vessel 120 for calibrating a monitoring pressure gauge 560, the apparatus comprising: a balance mounting shaft 134 installed vertically within the pressure vessel 120 and provided with a plurality of balance mounting bases 138 spaced apart from one another at predetermined intervals along an axial direction, and the standard pressure gauge 140, 142 being connected to lower portion of the balance mounting shaft; a plural sets of balances mounted between the respective balance mounting bases 138, each of which is composed of a plurality of balances; means for elevating each balance of the plural sets of the balances from the balance mounting base 138 separately or mounting the balance on the balance mounting base 138; and means for controlling the operation of the elevating means according to commands received from the outside.

18 Claims, 14 Drawing Sheets

CALIBRATION APPARATUS FOR VACUUM GAUGE HAVING COMBINED USE OF 1 TORR LEVEL, 10 TORR LEVEL, AND 100 TORR LEVEL

BACKGROUND OF THE INVENTION

1. Field of the Invention

The present invention relates to a calibration apparatus for vacuum gauge, and more in particular, to a calibration apparatus for vacuum gauge, which can be used not only for an 1 Torr level vacuum gauge, a 10 Torr level vacuum gauge, but also for a 100 Torr level vacuum gauge also.

2. Background of the Related Art

Recently, researches and developments about measurement of small pressure have been performed vigorously due to developments in environmental industries and process industries. In general, the measurement of small pressure refers to the measurement of pressures falling in a range below several thousands of Pa, that is, it refers to the measurement of pressures falling in the range from one-several hundredths to one-several thousandths of the atmospheric pressure, in view of the fact that the atmospheric pressure is about 100 kPa (100,000 Pa).

A measuring gauge for small pressure using mercury or oil has been developed or is under international development. The vacuum gauge for measuring small pressures can be divided into 1 Torr type vacuum gauge, 10 Torr type vacuum gauge, and 100 Torr type vacuum gauge depending on the commercial applications, and such vacuum gauge occupies 95% of all vacuum gauges.

Meanwhile, a laser interference type or an ultrasonic interference type mercury pressure gauge has been employed in calibration of such vacuum gauge for measuring small pressures. However, in general such reference pressure gauge has not been employed in general calibration body and test body due to its complexity of device and aversion for mercury. Accordingly, up to date, after any one vacuum gauge has been calibrated, a next vacuum gauge is calibrated with help of the previous calibrated vacuum gauge. However, such method increases uncertainty of the gauge, and decrease calibration efficiency because continuous periodical calibration (for instance, every six month) for reference gauge is necessarily in demand.

In addition, according to the recent technologies developed until now, the vacuum gauge for 10 Torr level vacuum has been calibrated by the calibration apparatus of 10 Torr type vacuum gauge, and the vacuum gauge for 100 Torr level vacuum has been calibrated by the calibration apparatus of 100 Torr type vacuum gauge respectively. Difficulties arising from the measurement and calibration have been increased, as the pressure to be measured becomes lower (for instance, 1 Torr).

FIG. 1 is a view for showing whole systematic construction of a calibration apparatus applicable to the present invention and to the conventional art. As shown in FIG. 1, the conventional calibration system for vacuum gauge may comprise a calibration apparatus for vacuum gauge 100, a gas supply device, a monitoring pressure gauge 560, and a gas discharge device.

The gas supply device comprises a gas supply valve 542, a volume variable valve 544, and a first vacuum pump 550, and the like for supplying predetermined pressure via a gas supply pipe 540 to a piston which will be described below. Especially, the first vacuum pump 550 includes a trap 552 for blocking back-streaming of oil vapor in addition to a pump valve 554 as rotary type pump is employed for it. Also, a portion of the gas supply pipe 540 is branched to be connected to the monitoring pressure gauge 560.

The gas discharge device operates to form a vacuum inside the calibration apparatus 100 of the vacuum gauge, and includes a second vacuum pump 580, a trap 582 and a blocking valve 584 having identical construction. Also, a needle valve 574 and a vent valve 572 are connected to one end of a gas discharge pipe 570.

Hereinafter, conventional art of the calibration apparatus for vacuum gauge shown in FIG. 1 will be described. FIG. 2 is a view for showing schematic construction of the conventional calibration apparatus 10 for vacuum gauge. As shown in FIG. 2, a pressure vessel 20 is sealed from the outside, and is provided with a piston 40 and a cylinder 42 constituting a force balance type pressure gauge within it. Also, the weight sets 30 are arranged above the piston 40, and a lower portion of the piston 40 is connected to the gas supply pipe 540.

In such calibration apparatus 10 for vacuum gauge, equilibrium state can be achieved by supplying gas via the gas supply pipe 540 after loading all the weight sets 30 on the piston 40. The piston 40 is maintained at a raised state after it has been come up by means of the equilibrium of upper and lower forces.

In this state, the monitoring pressure gauge 560 can be calibrated by determining whether the indicated value of the monitoring pressure gauge 560 conforms to the measured pressure value Pi based on following formula (1):

$$P_i = F/A + P_r \quad (1)$$

Here, $P_i$ represents measured pressure value, F represents total downward force obtained by adding the mass of the piston 40 and that of the tare weight, A represents cross-sectional area of the piston 40, and $P_r$ represents reference pressure inside the pressure vessel 20.

The reference pressure $P_r$ is the pressure formed around the piston, and becomes to be vacuum at the time of measuring the absolute pressure and becomes to be atmospheric pressure at the time of measuring the gauge pressure. The reference pressure $P_r$ is maintained at vacuum or atmospheric pressure and is regarded as a predetermined value during the measurement. However, as F represents gravitational load obtained by adding the mass of the piston and that of the weight sets in formula (1), it always has a minimum value exceeding the mass of the piston. Accordingly, with regard to the measured pressure $P_i$, minimum pressure (normally, several kPa) exists, which corresponds to the minimum value described above, and therefore, it is impossible to measure pressures below the above pressure.

A method for variable residual pressure, which is denoted by following formula (2), is suggested as a substitute for the above described measuring method, in which it is possible to cope with the change of the load due to change of the weight sets by maintaining the pressure $P_m$ below the piston to be uniform and varying the reference pressure $P_r'$ around the piston:

$$P_m = F/A + P_r' \quad (2)$$

Here, $P_m$ represents the pressure monitored below the piston, F represents the gravitational load obtained by adding the mass of the piston and that of the weight sets, A represents cross-sectional area of the piston, and $P_r'$ represents variable reference pressure around the piston.

However, such method has not also been employed in practical, because it is difficult to change the weights located within a vacuum chamber effectively without breaking such low pressure as it is under the vacuum or reference pressure.

Furthermore, calibration of the vacuum gauge is difficult and is not economical, because respective vacuum gauges such as 1 Torr type, 10 Torr type and 100 Torr type vacuum gauge should be calibrated by means of respective calibration apparatus for the vacuum gauge.

SUMMARY OF THE INVENTION

Accordingly, the present invention has been made to overcome above-mentioned problems arising from conventional technologies, and the object of the present invention is to provide a calibration apparatus for vacuum gauge, which is capable of measuring small pressure precisely, and calibrating several types of vacuum gauge such as 1 Torr type, 10 Torr type, and 100 Torr type vacuum gauge in an identical calibration apparatus.

To accomplish the above objects of the present invention, there is provided a calibration apparatus for vacuum gauge having a combined use for an 1 Torr level, a 10 Torr level, and a 100 Torr level vacuum gauge, in which a standard pressure gauge 140, 142 is installed within a pressure vessel 120 for calibrating a vacuum gauge, the apparatus including:

A shaft, connected to motor, installed vertically within the pressure vessel and provided with a plurality of weight-set mounting bases spaced apart from one another at predetermined intervals along an axial direction, the balance mounting shaft being connected at a lower portion thereof to the standard pressure gauge;

a plural sets of balances mounted between the respective balance mounting bases, and each of which being composed of a plurality of balances;

means for elevating each balance of the plural sets of the balances from the balance mounting base separately or mounting the balance on the balance mounting base; and means for controlling the operation of the elevating means according to commands received from the outside.

According to the present invention, the balance mounting bases 138 can be five, and the balance sets can also be five.

Also, according to the present invention, the balance sets can be five, and the first set of balance 210 is composed of three balances having respective masses of 1 g, 9 g and 90 g, the second set of balance 220 is composed of three balances having respective masses of 2 g, 18 g, and 180 g, the third set of balance 230 is composed of three balances having respective masses of 4 g, 36 g, and 360 g, the fourth set of balance 240 is composed of three balances having respective masses of 8 g, 72 g, and 720 g, and the fifth set of balance 250 is composed of three balances having respective masses of 3.332 g, 29.990 g, and 299.902 g.

Furthermore, according to the present invention, the elevating means comprises a servo motor 112 installed at the outside of the pressure vessel;

a rotary motion feed through 114 respectively connected at one side to the servo motor 112 for transferring the rotation force to the inside of the pressure vessel 120;

a lead screw 128 connected vertically and mounted rotatably to the other side of the rotary motion feed through 114 respectively;

a transporting shaft 129 mounted in parallel with the lead screw 128 in such a fashion as to be spaced apart from the lead screw at a predetermined interval;

a transporting head 130 connected in common to the lead screw 128 and the transporting shaft 129 to move upwardly and downwardly according to the rotation of the lead screw 128; and a plurality of arms 132 installed around the balance mounting shaft to extend from the transporting head 130 to the sets of balances for elevating the balances selectively.

In addition, the balance mounting shaft 134 is installed at center of the pressure vessel 120, and the lead screw 128 and the transporting shaft 129 are installed around the balance mounting shaft 134 at equal intervals.

Furthermore, the three balances of the respective sets of balance 210, 220, 230, 240, and 250 are preferably arranged in a descending order with regard to the gravity direction depending on respective masses. Also, the three balances of the respective sets of balance 210, 220, 230, 240, and 250 can be arranged in a descending order with regard to the gravity direction depending on respective diameters.

According to the present invention, the servo motor 112 comprises a step motor, and a brushless DC servo motor.

Also, the calibration apparatus can further comprises means for detecting the lowest and the highest elevation amount of the elevating means, detected signals of the detecting means are transmitted to the control means, and the control means can operate to stop the elevating means or actuate it continuously in response to the detected signals.

Meanwhile, the detecting means can be composed of a first limit switch 148 installed at the highest elevation height; a second limit switch 150 installed at the lowest elevation height; and an indicator 146 capable of reciprocating between the first and second limit switches 148, 150 in cooperation with the operation of the elevating means.

In addition, the standard pressure gauge can be composed of a cylinder 142 fixed within the pressure vessel and connected at one end to gas supply means; and a piston 140 a piston which is installed at the inside of the cylinder in such a fashion as to move upwardly and downwardly, and on which a balance is located.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
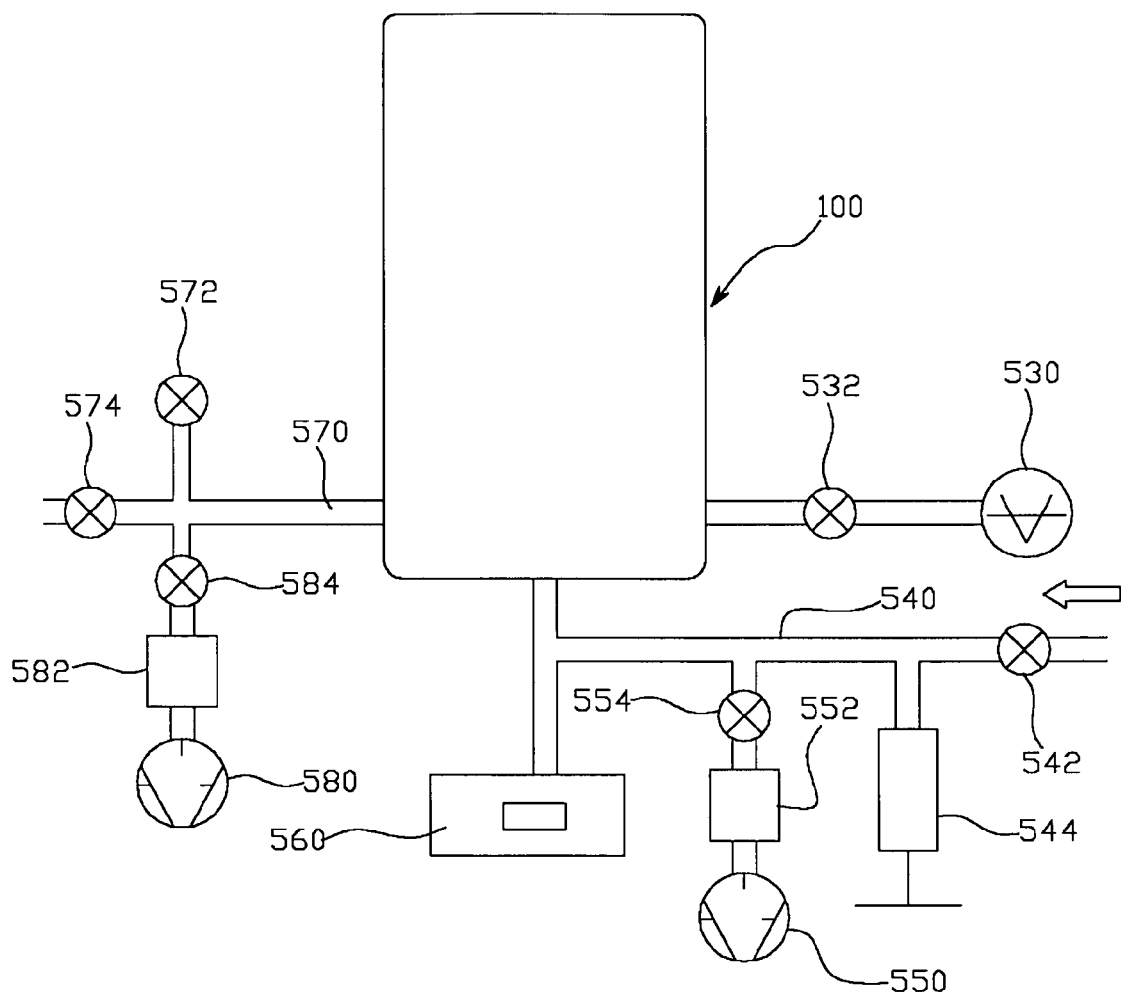
FIG. 1 is a view for showing whole systematic construction of a calibration apparatus for vacuum gauge applicable to the present invention and to the conventional art.
Figure 2:
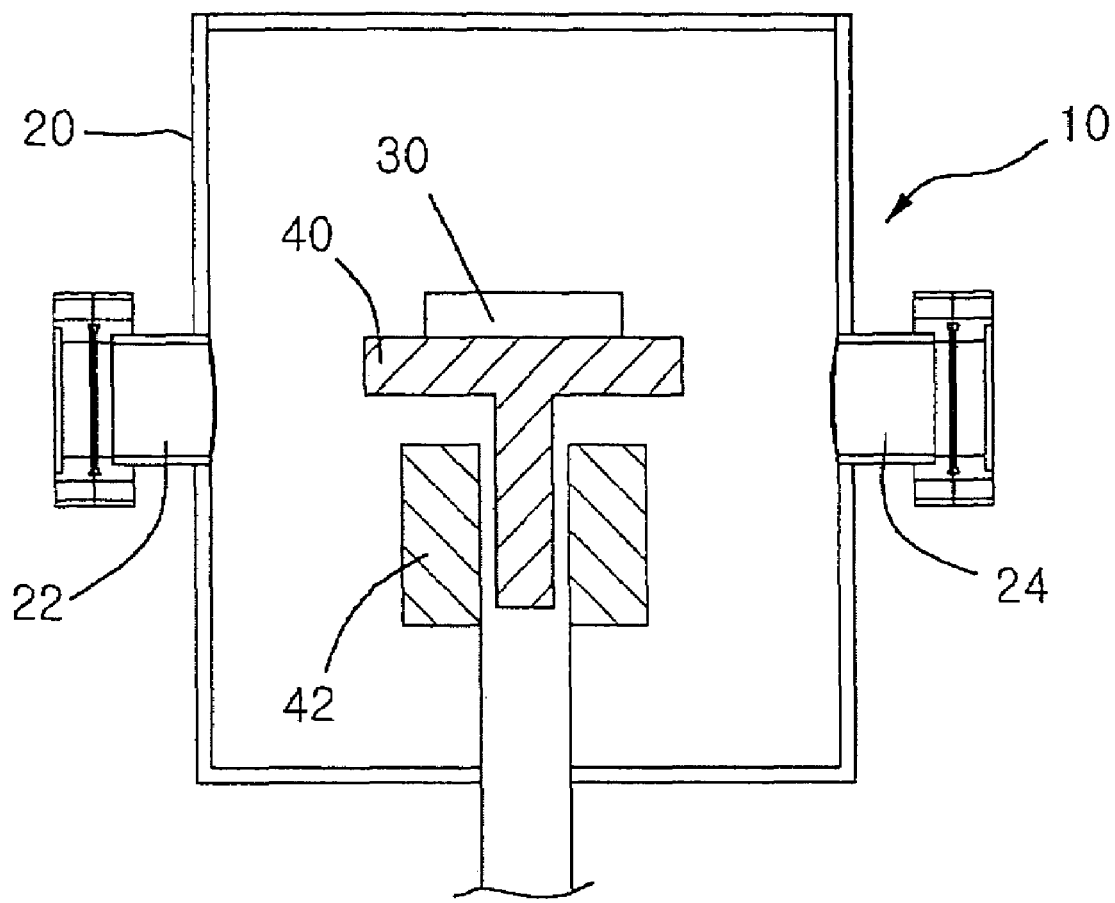
FIG. 2 is a schematic view for showing construction of the conventional calibration apparatus for vacuum gauge.

Preferred embodiments of the calibration apparatus for vacuum gauge and the calibration method for vacuum gauge using same of the present invention will now be described in detail in connection with the appended drawings below.

In the appended drawings and detailed description of the present invention, the same element, although depicted in different drawings, will be designated by the same reference numeral or character.

In FIG. 1, schematic description about the whole systematic construction of the calibration apparatus for vacuum gauge applicable to the present invention has been done as described above.

Figure 3:
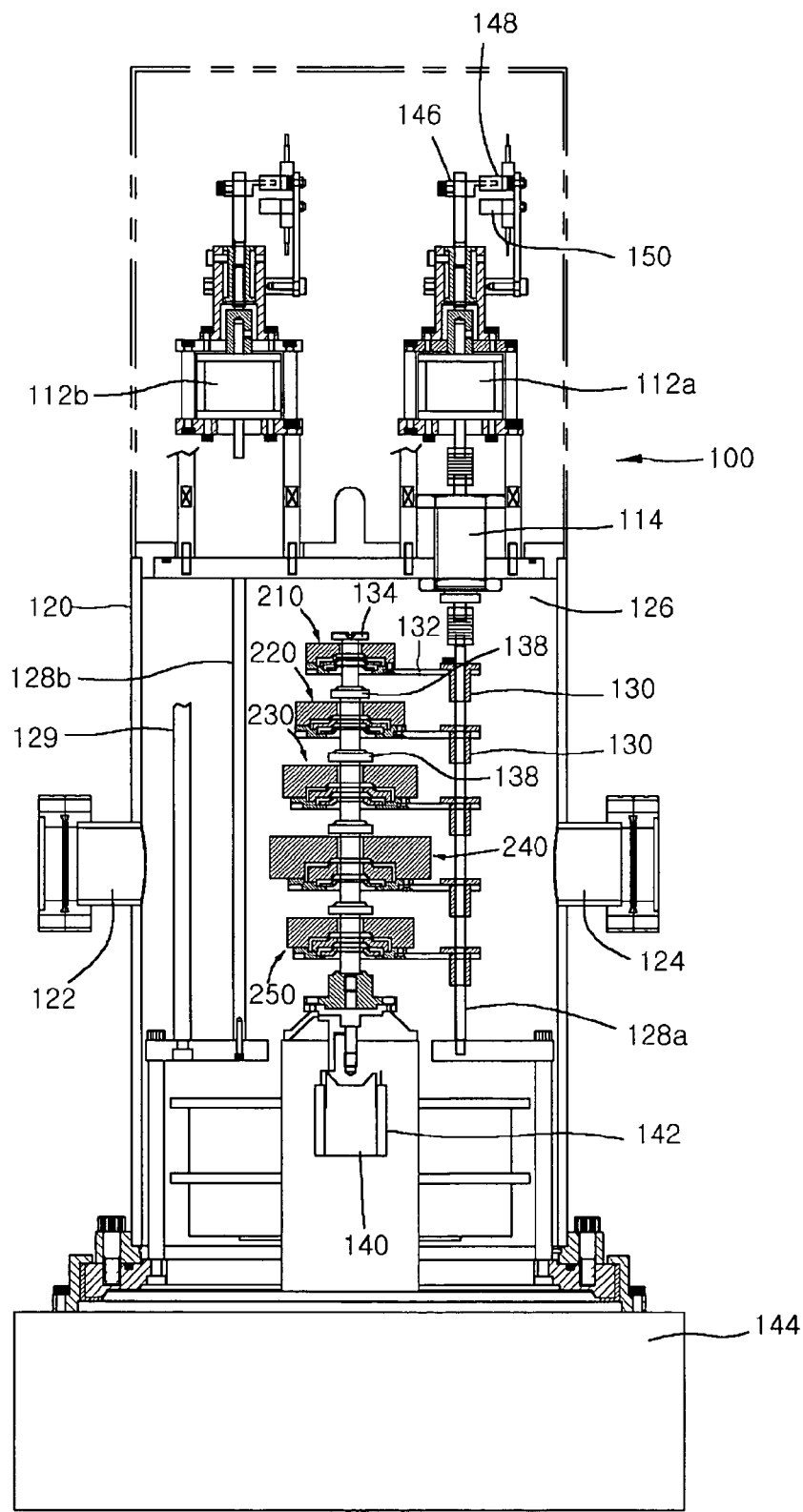
FIG. 3 is a schematic view for showing a calibration apparatus for vacuum gauge of the present invention having a combined use for an 1 Torr type, a 10 Torr type, and a 100 Torr type vacuum gauge.
Figure 4:
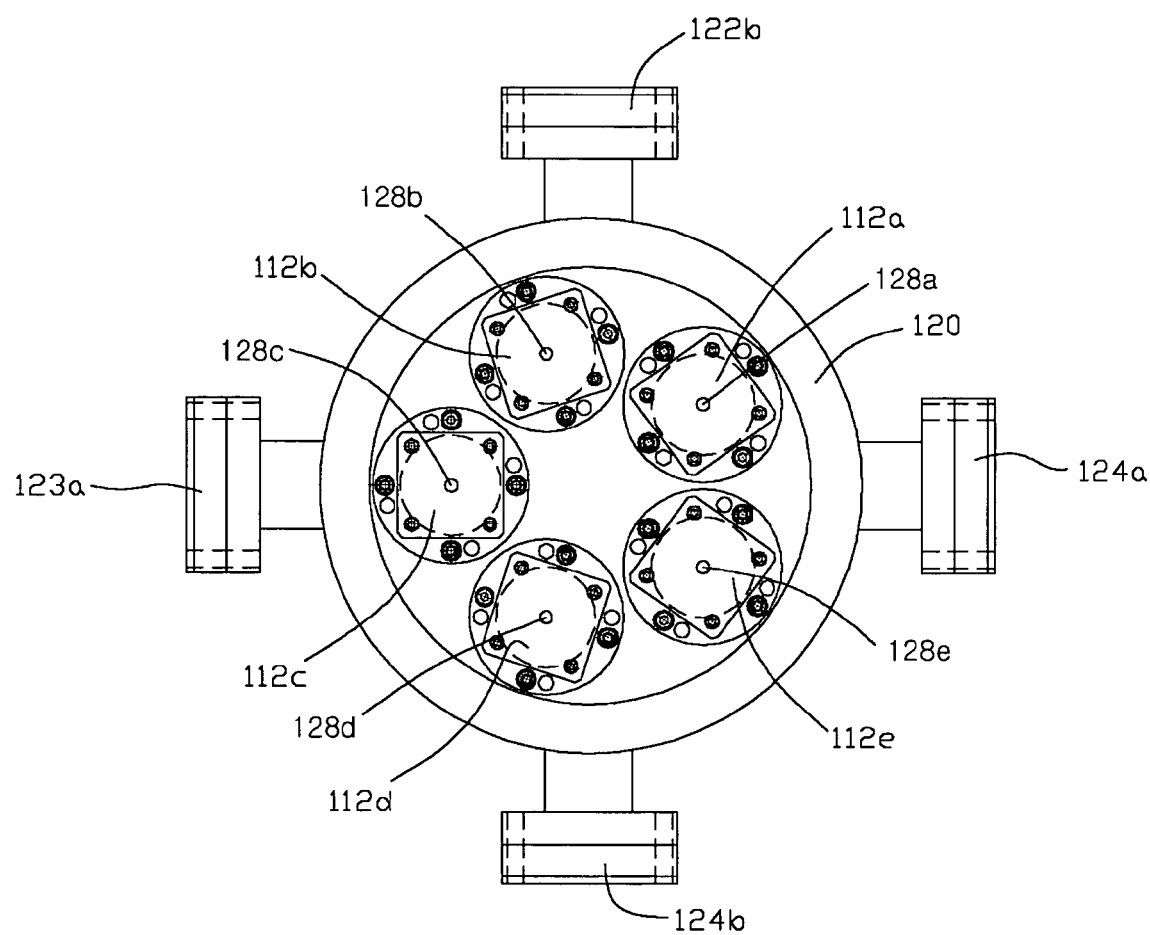
FIG. 4 is a planar view for showing the calibration apparatus for vacuum gauge shown in FIG. 3.

Hereinafter, detailed inside construction of the calibration apparatus for vacuum gauge shown in FIG. 1 will now be described below. First of all, FIG. 3 is a schematic view for showing a calibration apparatus 100 for vacuum gauge of the present invention having a combined use for an 1 Torr type, a 10 Torr type, and a 100 Torr type vacuum gauge, and FIG. 4 is a planar view for showing the calibration apparatus for vacuum gauge shown in FIG. 3. As shown in FIG. 3 and FIG. 4, The calibration apparatus 100 for vacuum gauge generally comprises a cylindrical pressure vessel 120, five step motors 112 installed above the pressure vessel 120, and a base 144 supporting the pressure vessel 120.

The five step motors 112 are composed of the first, second, third, fourth, and fifth step motor 112a, 112b, 112c, 112d, and 112e, installed at equal intervals above the pressure vessel 120. In the step motor 112, a rotation shaft (not shown) is projected to both ends thereof. Accordingly, one end of the rotation shaft transfers rotation force via a rotary motion feed through 114 to the inside of the pressure vessel 120, and the other end of the rotation shaft transforms rotation movement into linear movement to thereby move an indicator 146 upwardly and downwardly.

The indicator 146 can reciprocate between the highest point and the lowest point according to the rotation of the motor, and the first limit switch 148 and the second limit switch 150 are installed at the respective highest and lowest points. The limit switches 148, 150 are made of a photo-sensor, and the indicator 146 senses the present position by penetrating or blocking lights as it passes by the photo-sensor.

The rotary motion feed through 114 is a mechanical part transferring rotation force to the inside of the pressure vessel 120 concurrently with maintaining vacuum state within the pressure vessel 120. The detailed construction of the rotary motion feed through 114 is well known to those skilled in the relevant art to which the present invention pertains, so detailed description of it will be abridged. The rotary motion feed through 114 is installed at respective five step motors 112, and a lead screw 128 is connected via a coupling to an end of the rotary motion feed through. Therefore, the first rotary motion feed through 114a and the first lead screw 128a are connected to the first step motor 112a, and the second rotary motion feed through 114b and the second lead screw 128b are connected to the second step motor 112b. In FIG. 3, only two step motors 112a, 112b and two lead screws 128a, 128b have been shown for supporting the understand of the construction of the present invention.

Also, five transporting shafts 129 are arranged to be parallel with and near the respective lead screw 128 so as to make the transporting heads 130 to move linearly according to the rotation of the lead screw 128. Every transporting head 130 is connected to the respective lead screw 128, so one transporting head 130 is connected to the lead screw 128 and the transporting shaft 129 concurrently. Actually, the transporting heads 130 are arranged around the balance along a spiral trace.

The balance mounting shaft 134 having a desired height is located at center of the pressure vessel 120, and is provided with cylinder/piston type standard pressure gauge 140, 142. In the above described balance mounting shaft 134, five balance mounting bases 138, which project slightly in a longitudinal direction, are provided along an axial direction. Such balance mounting base 138 transfers the load of the balance to the standard pressure gauge 140, 142 when the balance has been lowered along the balance mounting shaft and is mounted on it.

The balance has been inserted into the balance mounting shaft 134, and is located between the respective balance mounting bases 138.

If it is to be more concretely described, the balance is composed of five sets of balances 210-250 as follows. The first set of balance 210 is composed of three balances having respective masses of 1 g, 9 g and 90 g, the second set of balance 220 is composed of three balances having respective masses of 2 g, 18 g, and 180 g, the third set of balance 230 is composed of three balances having respective masses of 4 g, 36 g, and 360 g, the fourth set of balance 240 is composed of three balances having respective masses of 8 g, 72 g, and 720 g, and the fifth set of balance 250 is composed of three balances having respective masses of 3.332 g, 29.990 g, and 299.902 g. This is listed in Table 1.

Further, a lift arm 132 is fixed to the transporting head 130 at one end so that it can move upwardly and downwardly along with the movement of the transporting head 130. The other end of the lift arm 132 is a free end and supports a lower portion of the balance. Concrete construction of the lift arm 132 will be described next time.

TABLE 1

| balance set | First balance (upper balance) | Second balance (mid balance) | Third balance (lower balance) |
| --- | --- | --- | --- |
| First set | 90 g | 9 g | 1 g |
| Second set | 180 g | 18 g | 2 g |
| Third set | 360 g | 36 g | 4 g |
| Fourth set | 720 g | 72 g | 8 g |
| Fifth set | 299.902 g | 29.990 g | 3.332 g |

The cylindrical pressure vessel 120 is made of metal, and four openings (the first opening 122a, the second opening 122b, the third opening 124a, and the fourth opening 124b) are formed at mid region of the vessel. These openings 122, 124 are formed to maintain vacuum within the pressure vessel 120 or to supply particular gas. The inside of the openings can be seen by naked eyes because they are closed by transparent window.

Figure 5:
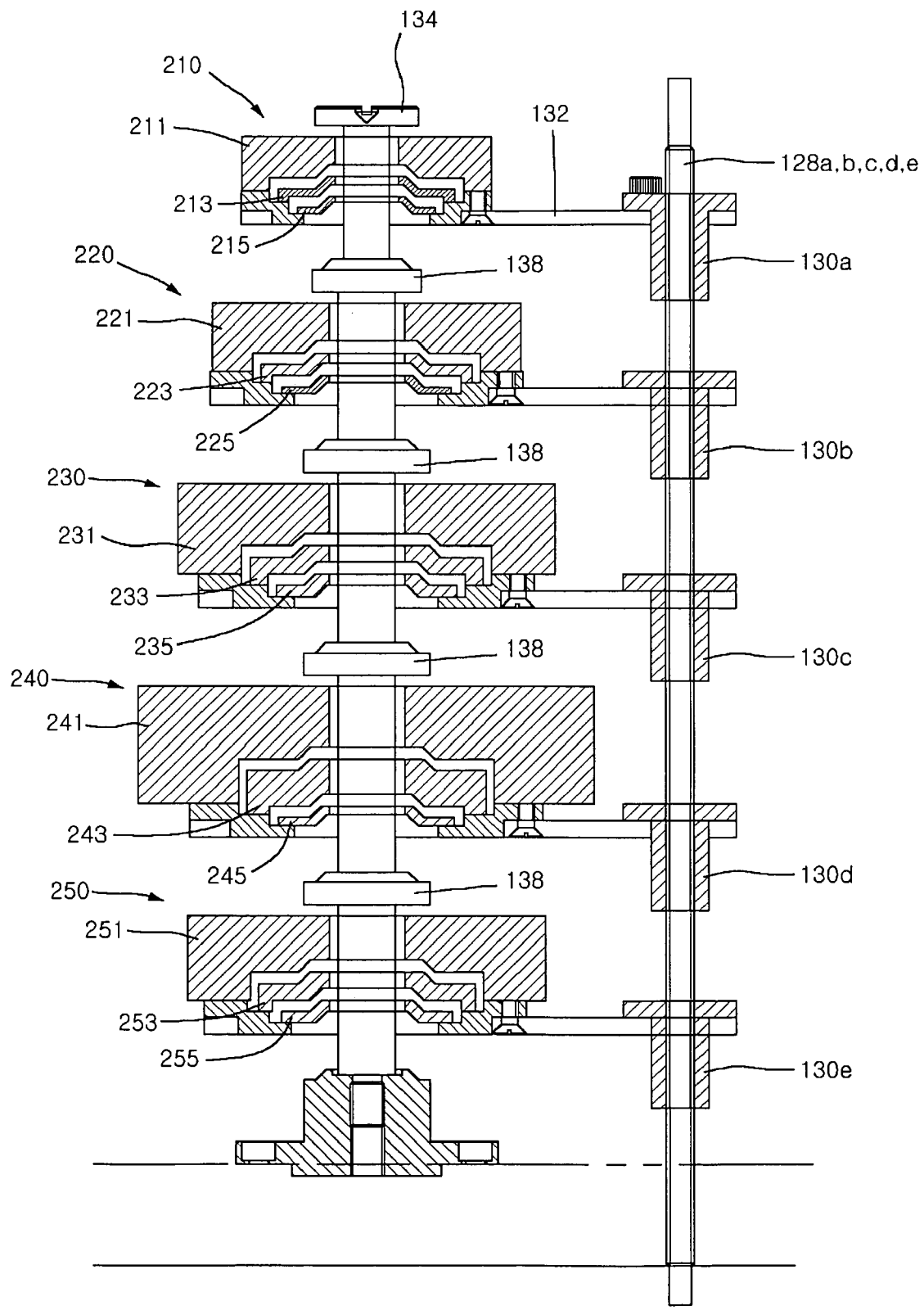
FIG. 5 is a view for showing only a set of balance and a balance elevation device constituting the calibration apparatus shown in FIG. 3.

FIG. 5 is a view for showing only a set of balance and a balance elevation device constituting the calibration apparatus shown in FIG. 3. As shown in FIG. 5, the first set of balance 210 is composed of three balances such as a balance 215 having a mass of 1 g, a balance 213 having a mass of 9 g and a balance 211 having a mass of 90 g, the second set of balance 220 is composed of three balances such as a balance 225 having a mass of 2 g, a balance 223 having a mass of 18 g, and a balance 221 having a mass of 180 g, the third set of balance 230 is composed of three balances such as a balance 235 having a mass of 4 g, a balance 233 having a mass of 36 g, and a balance 231 having a mass of 360 g, the fourth set of balance 240 is composed of three balances such as a balance 245 having a mass of 8 g, a balance 243 having a mass of 72 g, and a balance 241 having a mass of 720 g, and the fifth set of balance 250 is composed of three balances such as a balance 255 having a mass of 3.332 g, a balance 253 having a mass of 29.990 g, and a balance 251 having a mass of 299.902 g.

As described above, each set of balances 210, 220, 230, 240, and 250 is composed of three balances. Each balance is formed to be disk shape, and it has a different diameter depending on its weight. Accordingly, any of the three balances from each set of balance can be mounted by means of the lift arm 132 depends on its difference of height.

In FIG. 5, only one lead screw 128 with five transporting heads 130 is shown, however, the five lead screws 128a, 128b, 128c, 128d, and 128e are configured to surround the balance mounting shaft 134 and each transporting head 130 is connected to each lead screw 128 along the spiral trace.

Figure 6A:
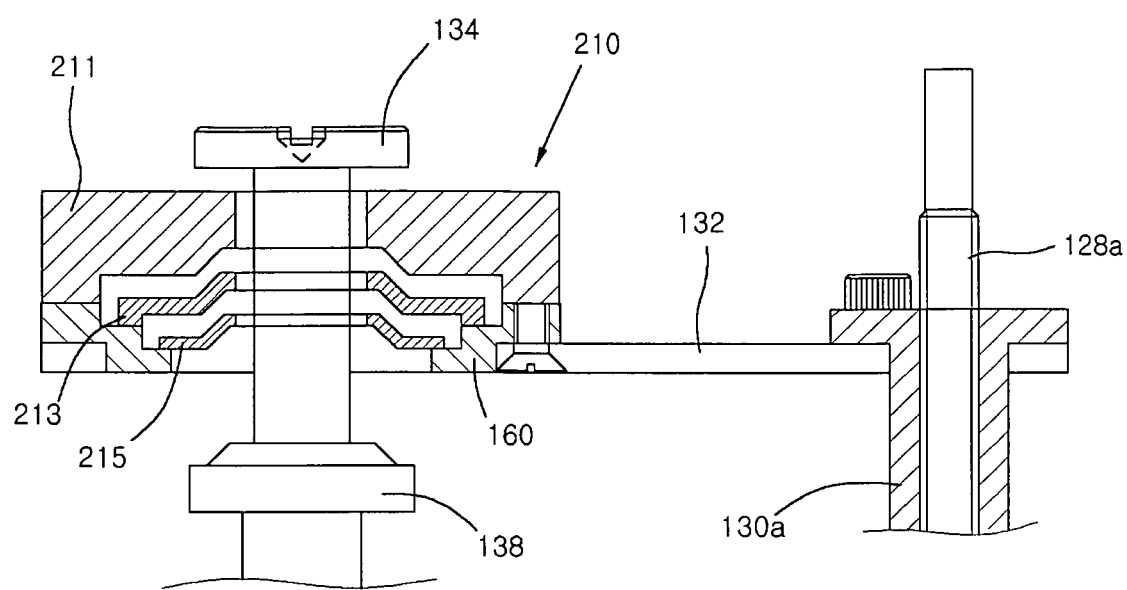
FIG. 6a is a schematic side cross-sectional view for showing the first set of balance 210 and a transporting head 130a shown in FIG. 5, when the load of the balance is not applied to a balance mounting base 138.

FIG. 6a is a schematic side cross-sectional view for showing the first set of balance 210 and a transporting head 130a among the plural sets of balance shown in FIG. 5, when load of the balance is not applied to a balance mounting base 138. As shown in FIG. 6a, an upper surface of the balance 215 having a mass of 1 g is configured to overlap with a lower surface of the balance 213 having a mass of 9 g, and an upper surface of the balance 213 having a mass of 9 g is configured to overlap with a lower surface of the balance 211 having a mass of 90 g.

Furthermore, a lifter 160 is fixed to free end of the lift arm 132. A through hole for the balance mounting base 138 is formed at center of the lifter 160 having a circular disk shape. Three circular step portions are formed at the circumferential edge of the lifter 160 in radial direction, and each step portion has a height enough to contact with corresponding lower surface of the balances 215, 213, and 211 having respective masses of 1 g, 10 g, and 100 g.

Accordingly, as shown in FIG. 6a, when the transporting head 130a is moved upwardly to lift the arm 132 and the lifter 160, the balance 215 having a mass of 1 g, the balance 213 having a mass of 9 g, and the balance 211 having a mass of 90 g are lifted upwardly by the lifter 160 at the same time. Of course, instead of a bolt, various fixing means such as adhesives and the like can be used to fix the lifter 160 to the lift arm 132.

Figure 6B:
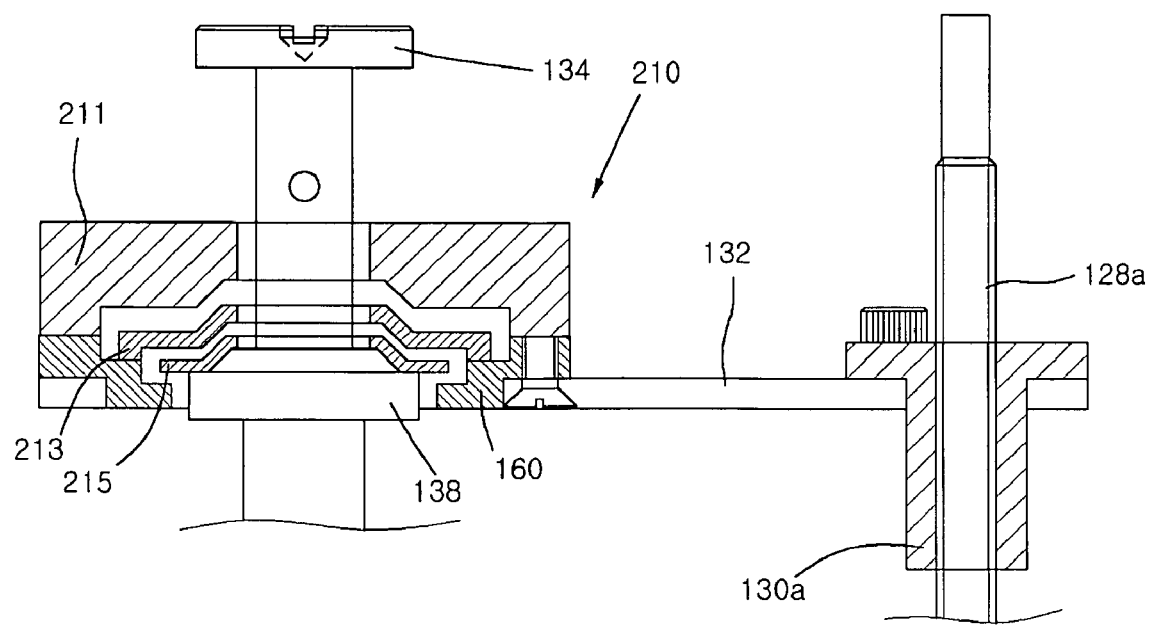
FIG. 6b is a side cross-sectional view similar to FIG. 6a, when a balance 215 having a mass of 1 g is lowered to the balance mounting base 138.

FIG. 6b is a side cross-sectional view similar to FIG. 6a, when a balance 215 having a mass of 1 g is lowered to the balance mounting base 138. As shown in FIG. 6b, when the first transporting head 130a is lowered by the rotation of the first lead screw 128a, the lift arm 130 and the lifter 160 move in the downward direction integrally. In this instance, the lowering height is preferable to be so high as to mount the single balance 215 having a mass of 1 g on the balance mounting base 138. That is, in a state shown in FIG. 6b, gravity load of 1 g is applied to the standard pressure gauge 140, 142.

Figure 6C:
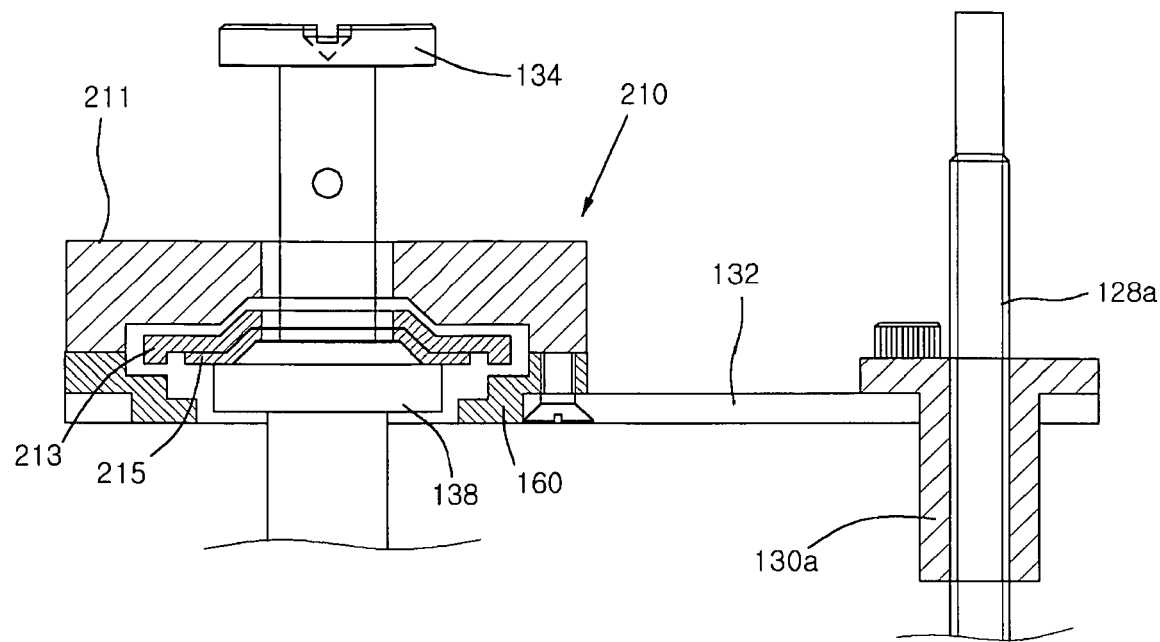
FIG. 6c is a side cross-sectional view similar to FIG. 6a, when a balance 215 having a mass of 1 g and a balance 213 having a mass of 9 g are lowered to the balance mounting base 138 to thereby apply total 10 g gravity load.

FIG. 6c is a side cross-sectional view similar to FIG. 6a, when only the balance 215 having a mass of 1 g and the balance 213 having a mass of 9 g are lowered to the balance mounting base 138 so that total 10 g gravity load is applied. As shown in FIG. 6c, when the first lead screw 128a is additionally rotated to thereby lower the first transporting head 130a, the lift arm 132 and the lifter 160 are lowered integrally in addition. In this instance, the lowering height is preferable to be so high as to mount the balance 215 having a mass of 1 g and the balance 213 having a mass of 9 g on the balance mounting base 138. That is, in a state shown in FIG. 6c, as the balance having a mass of 1 g and the balance 213 having a mass of 9 g are located in contact with each other and are mounted on the balance mounting base 138, so total gravity load of 10 g is applied to the standard pressure gauge 140, 142, however, the balance 211 having a mass of 90 g is supported by the lifter 160.

Figure 6D:
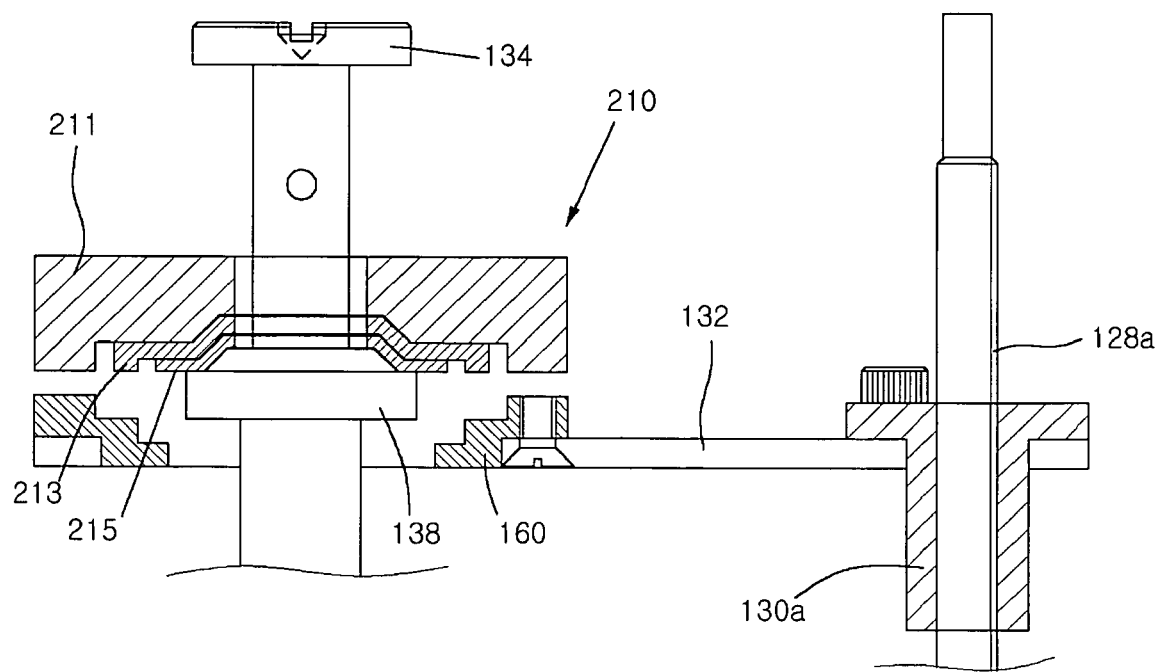
FIG. 6d is a side cross-sectional view similar to FIG. 6a, when a balance 215 having a mass of 1 g, a balance 213 having a mass of 9 g, and a balance 211 having a mass of 90 g are lowered to the balance mounting base 138 to thereby apply total 100 g gravity load.

FIG. 6d is a side cross-sectional view similar to FIG. 6a, when the balance 215 having a mass of 1 g, the balance 213 having a mass of 9 g, and the balance 211 having a mass of 90 g are lowered to the balance mounting base 138 so that total 100 g gravity load is applied. As shown in FIG. 6d, when the first lead screw 128a is additionally rotated to thereby lower the first transporting head 130a, the lift arm 132 and the lifter 160 are lowered integrally in addition. In this instance, the lowering height is preferable to be so high as to mount all the balance 215 having a mass of 1 g, the balance 213 having a mass of 9 g and the balance 211 having a mass of 90 g on the balance mounting base 138. That is, in a state shown in FIG. 6d, as the balance having a mass of 1 g, the balance 213 having a mass of 9 g and the balance 211 having a mass of 90 g are located in contact with each other and are mounted on the balance mounting base 138, so total gravity load of 100 g is applied to the standard pressure gauge 140, 142, however, the load of the balance is not applied on the lifter 160.

As shown in FIG. 6a to FIG. 6d, the first transporting head 130a reaches at a highest position shown in FIG. 6a and reaches at a lowest position shown in FIG. 6d by the rotation of the first lead screw 128a.

Such highest and lowest positions are also shown in an opposite side (upper rotation shaft on the basis of FIG. 3) of the first step motor 112a proportionally. Accordingly, the first limit switch 148 is installed at the highest position, and the second limit switch 150 is installed at the lowest position. As a result, during an initialization process of the position of the each transporting head at the beginning of the operation, the indicator 146 passes the highest position, that is the first limit switch 148, or the lowest position, that is, the second limit switch 150 so that the present position can be set accurately as a reference position.

While the elevating operation of the first set of balance 210 has been described with regard to the accompanying FIG. 6a to FIG. 6d, however, such structure is identical with all of the second, third, fourth, and the fifth sets of balances 220, 230, 240, and 250, and such operation can be performed in same way.

Hereinafter, the balance combinations for respective vacuum level in the calibration apparatus for vacuum gauge having a combined use for an 1 Torr level, a 10 Torr level, and a 100 Torr level vacuum gauge according to the present invention will be described below.

First of all, balance combinations for calibrating the 1 Torr level vacuum gauge will be described. In view of the pressure transformation, 1 Torr corresponds to 133.32 Pa, so that balance combinations for 10 Pa, 20 Pa, 30 Pa, . . . 120 Pa, 133.32 Pa are required to calibrate the 1 Torr level vacuum gauge. Balance combinations for such pressure stages are listed in Table 2.

TABLE 2

| Pressure | Balance combination |
| --- | --- |
| 10 Pa | 1 g |
| 20 Pa | 2 g |
| 30 Pa | 1 g + 2 g |
| 40 Pa | 4 g |
| 50 Pa | 1 g + 4 g |
| 60 Pa | 2 g + 4 g |
| 70 Pa | 1 g + 2 g + 4 g |
| 80 Pa | 8 g |
| 90 Pa | 1 g + 8 g |
| 100 Pa | 2 g + 8 g |
| 110 Pa | 1 g + 2 g + 8 g |
| 120 Pa | 4 g + 8 g |
| 130 Pa | 1 g + 4 g + 8 g |
| 133.32 Pa (=1 Torr) | 2 g + 8 g + 3.332 g |
| 140 Pa | 2 g + 4 g + 8 g |
| 150 Pa | 1 g + 2 g + 4 g + 8 g |
| 160 Pa | 1 g + 2 g + 4 g + 9 g |

As can be seen from Table 2, it is possible to change pressures from 0 Pa to 160 Pa in stage by appropriately combining prepared balances so as to calibrate the 1 Torr level vacuum gauge, it is also possible to calibrate a pressure of 1 Torr (133.32 Pa) accurately.

It is necessary to monitor the difference between the pressure values of the standard pressure gauges 140, 142 and the vacuum gauge (not shown) to be calibrated with increasing the pressures in an ascending order such as from 10 Pa, 20 Pa, 30 Pa, . . . 120 Pa, 133.32 Pa, 140 Pa, 150 Pa, to 160 Pa in stage, and then decreasing the pressures in a descending order such as from 160 Pa, 150 Pa, 140 Pa, 133.32 Pa, 120 Pa, . . . , 30 Pa, 20 Pa, 10 Pa, to 0 Pa so as to calibrate the 1 Torr level vacuum gauge.

Figure 7:
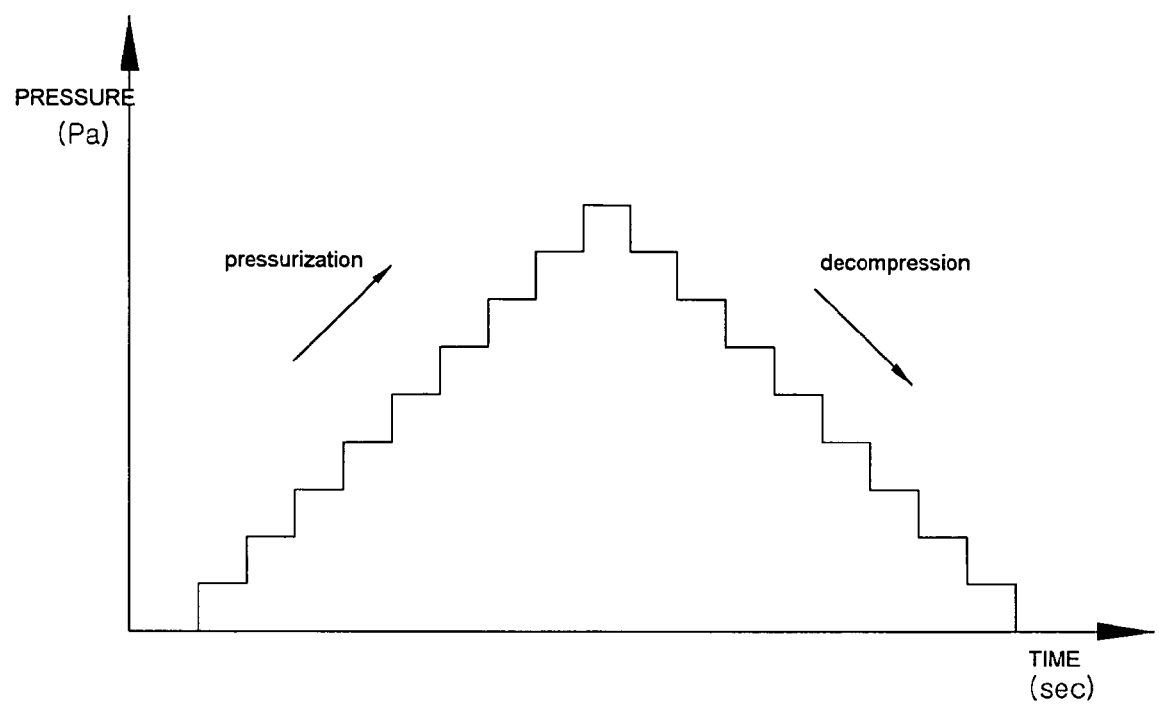
FIG. 7 is a graphic view for showing processes of arranging balances sequentially on the mounting base, pressurizing the reference pressure gauge, and then reducing the pressure so as to calibrate a vacuum gauge of a particular level.

FIG. 7 is a graphic view for showing processes of arranging balances sequentially on the mounting base, pressurizing the standard pressure gauge, and then reducing the pressure so as to calibrate the vacuum gauge of a particular level. In FIG. 7, a horizontal axis denotes for time (sec), and a vertical axis denotes for pressure Pa applied by the balance. Balance combinations for calibrating the 10 Torr level vacuum gauge will be described below. In view of the pressure transformation, 10 Torr corresponds to 1333.2 Pa, so that balance combinations for 100 Pa, 200 Pa, 300 Pa, . . . , 1200 Pa, 1333.2 Pa are required to calibrate the 10 Torr level vacuum gauge. Balance combinations for such pressure stages are listed in Table 3.

TABLE 3

| Pressure | Balance combination |
| --- | --- |
| 100 Pa | 1 g + 9 g |
| 200 Pa | 2 g + 18 g |
| 300 Pa | 1 g + 2 g + 9 g + 18 g |
| 400 Pa | 4 g + 36 g |
| 500 Pa | 1 g + 4 g + 9 g + 36 g |
| 600 Pa | 2 g + 4 g + 18 g + 36 g |
| 700 Pa | 1 g + 2 g + 4 g + 9 g + 18 g + 36 g |
| 800 Pa | 8 g + 72 g |
| 900 Pa | 90 g |
| 1000 Pa | 1 g + 9 g + 90 g |
| 1100 Pa | 2 g + 18 g + 90 g |
| 1200 Pa | 1 g + 2 g + 9 g + 18 g + 90 g |
| 1300 Pa | 4 g + 36 g + 90 g |
| 1333.2 Pa (=10 Torr) | 1 g + 3.332 g + 9 g + 29.990 g + 90 g |
| 1400 Pa | 1 g + 4 g + 9 g + 36 g + 90 g |
| 1500 Pa | 2 g + 4 g + 18 g + 36 g + 90 g |
| 1600 Pa | 1 g + 2 g + 4 g + 9 g + 18 g + 36 g + 90 g |

As can be seen from Table 3, it is possible to change pressures from 10 Pa to 1600 Pa in stage by appropriately combining prepared balances so as to calibrate the 10 Torr level vacuum gauge, it is also possible to calibrate a pressure of 10 Torr (1333.2 Pa) accurately. The reason why pressures for respective stages as shown in Table 3 are required is identical with that of calibrating the 1 Torr level vacuum gauge.

Balance combinations for calibrating the 100 Torr level vacuum gauge will be described below. In view of the pressure transformation, 100 Torr corresponds to 13332.24 Pa, so that balance combinations for 1000 Pa, 2000 Pa, 3000 Pa, . . . , 12000 Pa, 13332.24 Pa are required to calibrate the 100 Torr level vacuum gauge. Balance combinations for such pressure stages are listed in Table 4.

As can be seen from Table 4, it is possible to change pressures from 0 Pa to 14000 Pa in stage by appropriately combining prepared balances so as to calibrate the 100 Torr level vacuum gauge, it is also possible to calibrate a pressure of 100 Torr (13332.24 Pa) accurately. The reason why pressures for respective stages as shown in Table 4 are required is identical with that of calibrating the 1 Torr level vacuum gauge.

TABLE 4

| Pressure | Balance combination |
| --- | --- |
| 1000 Pa | 1 g + 9 g + 90 g |
| 2000 Pa | 2 g + 18 g + 180 g |
| 3000 Pa | 1 g + 2 g + 9 g + 18 g + 90 g + 180 g |
| 4000 Pa | 4 g + 36 g + 360 g |
| 5000 Pa | 1 g + 4 g + 9 g + 36 g + 90 g + 360 g |
| 6000 Pa | 2 g + 4 g + 18 g + 36 g + 180 g + 360 g |
| 7000 Pa | 1 g + 2 g + 4 g + 9 g + 18 g + 36 g + 90 g + 180 g + 360 g |
| 8000 Pa | 8 g + 72 g + 720 g |
| 9000 Pa | 180 g + 720 g |
| 10000 Pa | 8 g + 72 g + 180 g + 720 g |
| 11000 Pa | 2 g + 18 g + 360 g + 720 g |
| 12000 Pa | 1 g + 2 g + 9 g + 18 g + 90 g + 360 g + 720 g |

TABLE 4-continued

| Pressure | Balance combination |
| --- | --- |
| 13000 Pa | 4 g + 36 g + 180 g + 360 g + 720 g |
| 13332.24 Pa (=100 Torr) | 3.332 g + 8 g + 29.990 g + 72 g + 180 g + 299.902 g + 720 g |
| 14000 Pa | 1 g + 2 g + 4 g + 8 g + 9 g + 18 g + 36 g + 72 g + 90 g + 180 g + 360 g + 720 g |

An actual calibrating method for vacuum gauge using the combination of balances and construction of the present invention will now be described below.

Figure 8A:
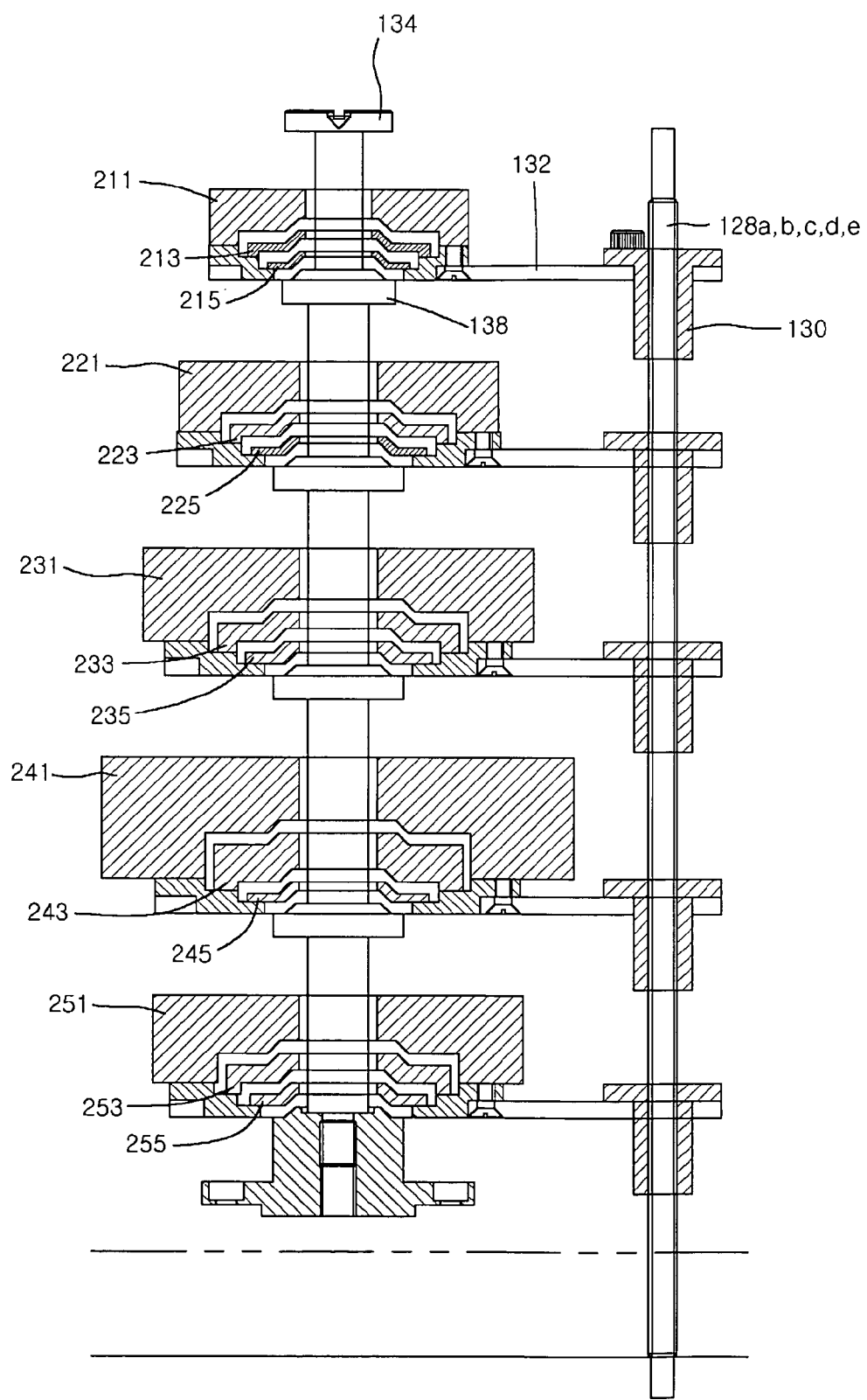
FIG. 8a is a side cross-sectional view for showing a initial preparing step for calibrating respective vacuum gauges including an 1 Torr level, a 10 Torr level, and a 100 Torr level vacuum gauge, wherein every set of balance 210, 220, 230, 240, and 250 is arranged on the corresponding balance mounting base 138.

FIG. 8a is a side cross-sectional view for showing an initial preparing step for calibrating respective vacuum gauges including an 1 Torr level, a 10 Torr level, and a 100 Torr level vacuum gauge, wherein every set of balance 210, 220, 230, 240, and 250 is arranged on the corresponding balance mounting base 138. Accordingly, a load of the balance has not been transferred to the standard pressure gauge.

Figure 8B:
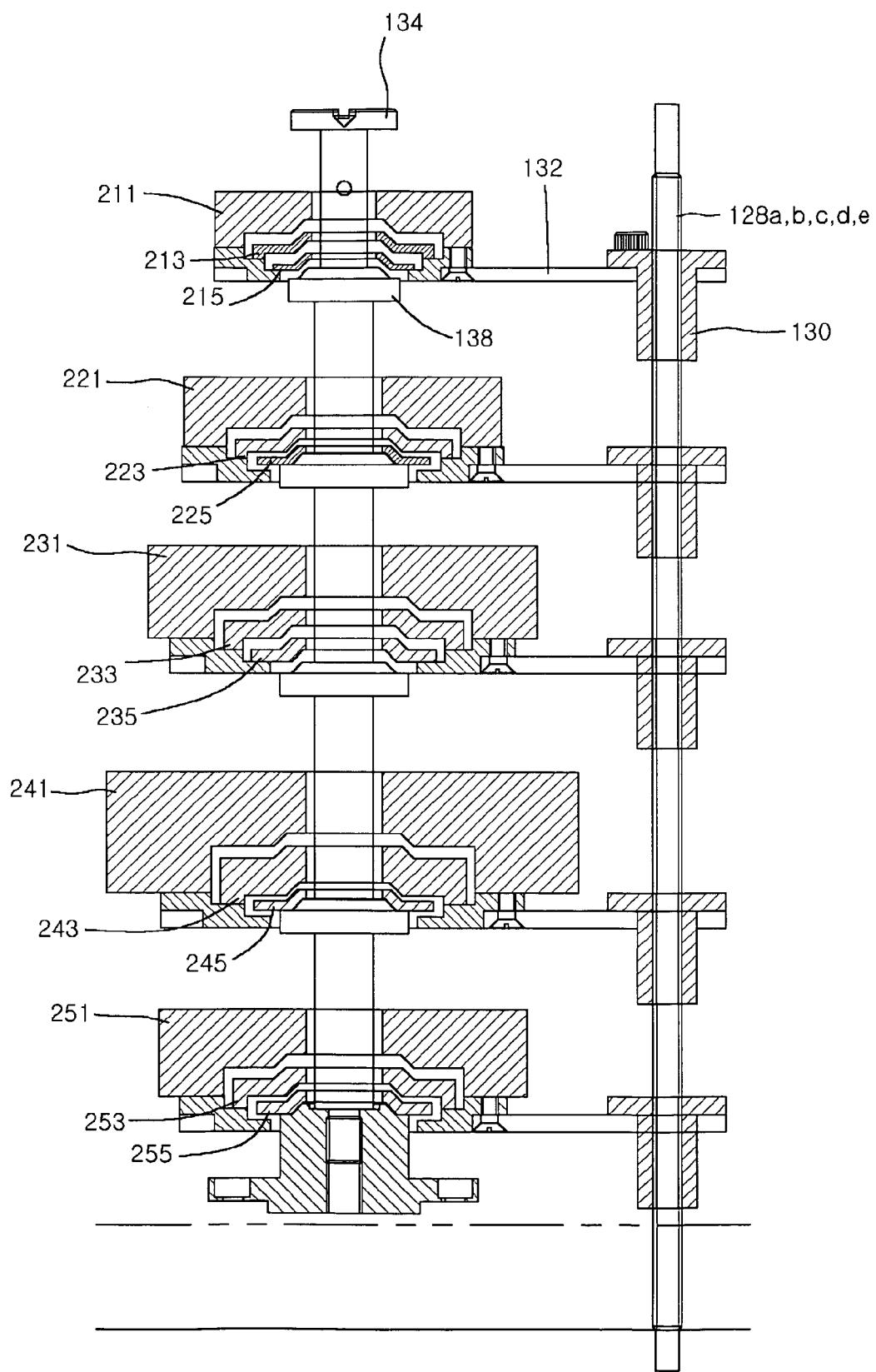
FIG. 8b is a side cross-sectional view for showing a calibration step of an 1 Torr level vacuum gauge, wherein a balance 225 having a mass of 2 g, a balance 245 having a mass of 8 g, a balance 255 having a mass of 3.332 g are arranged on the corresponding balance mounting bases to thereby apply load on the standard pressure gauge 140, 142.

FIG. 8b shows a calibration step of an 1 Torr level vacuum gauge. The balance combination for applying 1 Torr (=133.32 Pa) is 2 g+8 g+3.332 g, as can be seen in Table 2. Accordingly, as shown in FIG. 8b, a balance 225 having a mass of 2 g, a balance 245 having a mass of 8 g, and a balance 255 having a mass of 3.332 g are arranged on the corresponding balance mounting bases 138, and remaining balances are maintained to be spaced from the balance mounting bases 138 by means of the lift arm 132.

Figure 8C:
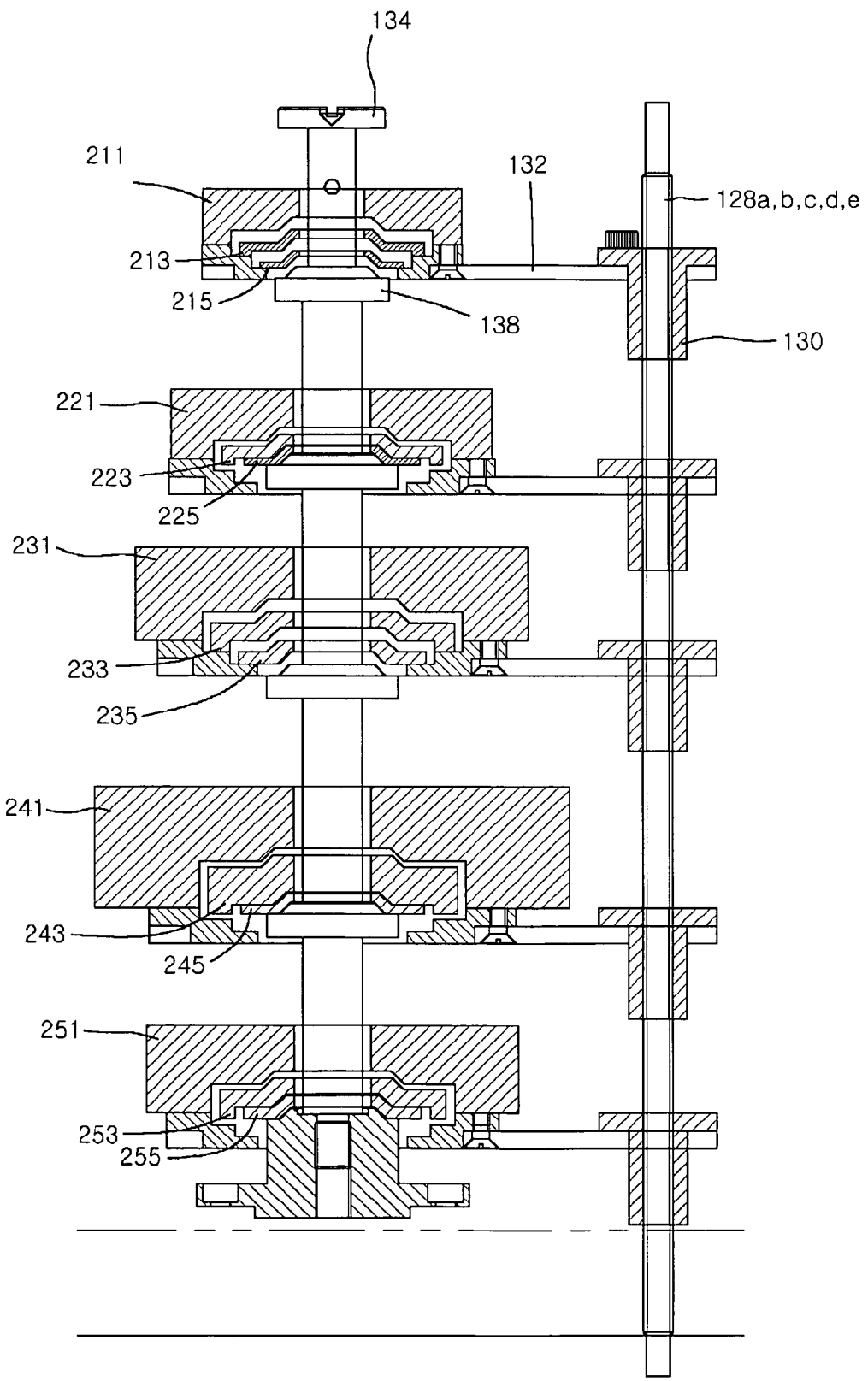
FIG. 8c a side cross-sectional view for showing a calibration step of a 10 Torr level vacuum gauge, wherein a balance 225 having a mass of 2 g, a balance 223 having a mass of 18 g, a balance 245 having a mass of 8 g, a balance 243 having a mass of 72 g, a balance 255 having a mass of 3.332 g, and a balance 253 having a mass of 29.990 g are arranged on the corresponding balance mounting bases to thereby apply load on the standard pressure gauge 140, 142.

FIG. 8c shows a calibration step of a 10 Torr level vacuum gauge. The balance combination for applying 10 Torr (=1333.2 Pa) is 1 g+3.332 g+9 g+29.990 g+90 g, as can be seen in Table 3. Accordingly, as shown in FIG. 8c, a balance 215 having a mass of 1 g, a balance 213 having a mass of 9 g, a balance 211 having a mass of 90 g, a balance 255 having a mass of 3.332 g, and a balance 253 having a mass of 29.990 g are arranged on the corresponding balance mounting bases 138, and remaining balances are maintained to be spaced from the balance mounting bases 138 by means of the lift arm 132.

Figure 8D:
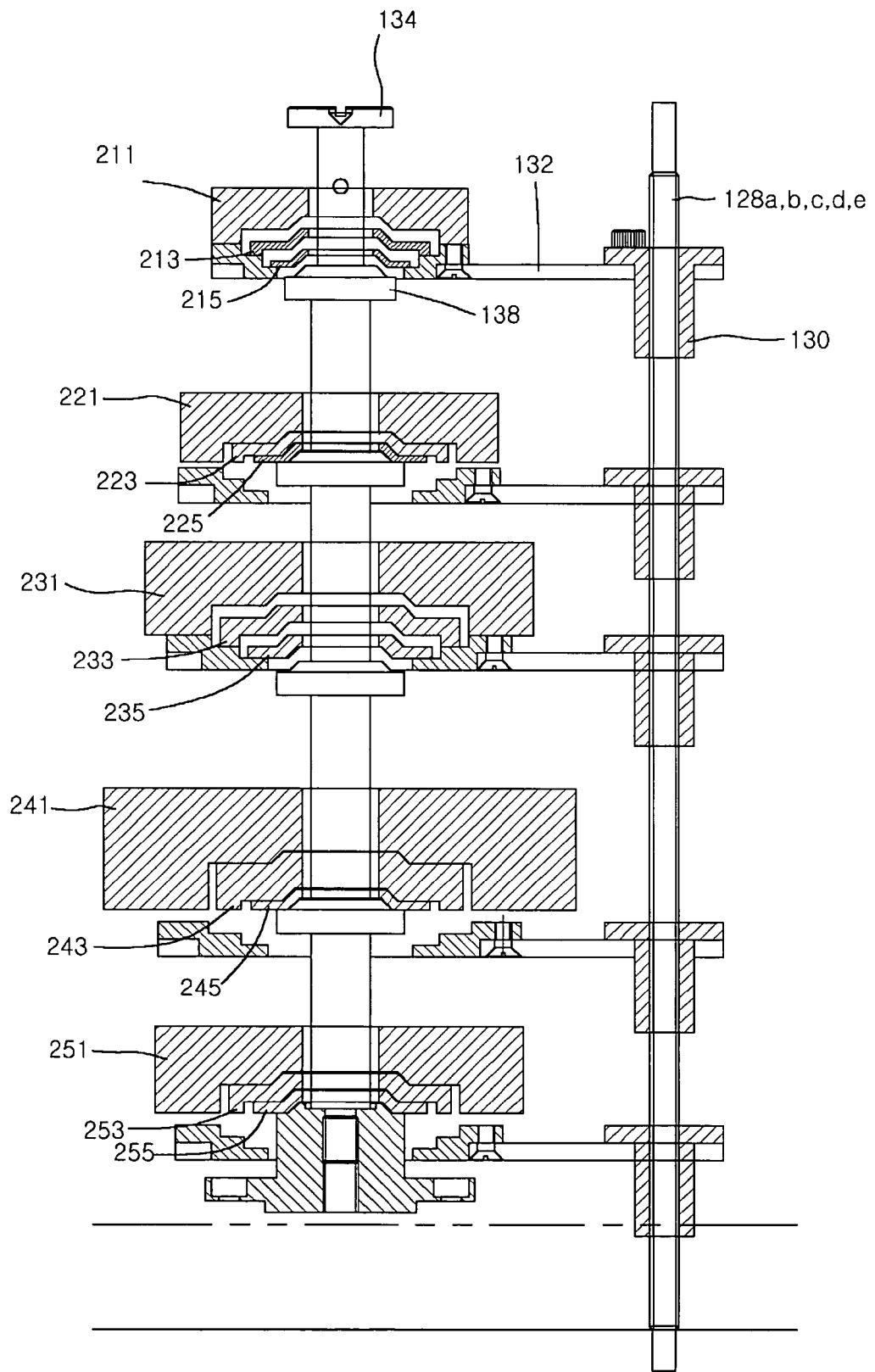
FIG. 8d is a side cross-sectional view for showing a calibration step of a 100 Torr level vacuum gauge, wherein a balance 255 having a mass of 3.332 g, a balance 245 having a mass of 8 g, a balance 253 having a mass of 29.990 g, a balance 243 having a mass of 72 g, a balance 221 having a mass of 180 g, a balance 225 having a mass of 2 g, a balance 223 having a mass of 18 g, a balance 251 having a mass of 299.902 g, and a balance 241 having a mass of 720 g are arranged on the corresponding balance mounting bases to thereby apply load on the standard pressure gauge 140, 142.

FIG. 8d shows a calibration step of a 100 Torr level vacuum gauge. The balance combination for applying 100 Torr (=13332.24 Pa) is 3.332 g+8 g+29.990 g+72 g+180 g+299.902 g+720 g, as can be seen in Table 4. Accordingly, as shown in FIG. 8d, a balance 255 having a mass of 3.332 g, a balance 245 having a mass of 8 g, a balance 253 having a mass of 29.990 g, a balance 243 having a mass of 72 g, a balance 221 having a mass of 180 g, a balance 251 having a mass of 299.902 g, and a balance 241 having a mass of 720 g are arranged on the corresponding balance mounting bases 138, and remaining balances are maintained to be spaced from the balance mounting bases 138 by means of the lift arm 132.

In the description of the present invention, the rotating lead screw and the fixed transporting shaft are employed to elevate the transporting head and the lift arm upwardly and downwardly. However, this is only illustrative, and they can be elevated upwardly and downwardly by transforming the rotation force of the motor into linear elevation operation by means of employing a linear motor, a cam with cam shaft, a rack and pinion, and various link devices, and the like. Such mechanical transformations should be construed to be pertained to the scope of the present invention.

Furthermore, it has been described that the calibration apparatus of the present invention can be used for an 1 Torr level vacuum gauge, a 10 Torr level vacuum gauge, and a 100 Torr level vacuum gauge concurrently. However, as is well known to those skilled in the relevant art, any of the pressure level to be calibrated can be omitted. For instance, the calibration apparatus can be modified to be used only in calibrating an 1 Torr level vacuum gauge and a 10 Torr level vacuum gauge by adjusting the mass and the number of the balances, and it can be also modified to be used only in calibrating a 10 Torr level vacuum gauge and a 100 Torr level vacuum gauge. Of course, such modifications will be pertained to the scope of the present invention.

In addition, the transporting heads can be installed between the lead screws, and two transporting heads can be connected to one transporting shaft at different heights by providing three transporting heads. In this case, they will not interfere with each other because the transporting heads reciprocate at different positions.

As described above, according to the calibration apparatus for vacuum gauge having combined use for an 1 Torr level, a 10 Torr level, and a 100 Torr level vacuum gauge of the present invention, it is possible to measure small pressures precisely, and calibrate the 1 Torr level, a 10 Torr level, and a 100 Torr level vacuum gauge by means of a calibration apparatus.

Accordingly, it is possible to reduce calibration cost, and decrease required calibration time. It is also possible to calibrate various pressure levels of vacuum gauges quickly as the economic efficiency and effectiveness have been improved.

Furthermore, it is possible to detect hysteresis and the like by applying identical pressure under an identical condition. Accordingly, repeating reproduction property is excellent.

In addition, the calibration apparatus for vacuum gauge of the present invention can be installed on a table because its compact appearance. Accordingly, it is possible to calibrate the vacuum gauge with very high degree of precision and occupation of small space. For instance, the pressure gauge using Hg has been uneconomical in installment, operation and measurement owing to its large size.

Although the present invention has been described in connection with the above described preferred embodiments, it should be understood that various modifications, additions and substitutions can be made by those skilled in the art without departing from the scope and spirit of the present invention disclosed in the accompanying claims.

What is claimed is:

1. A calibration apparatus for vacuum gauge having a combined use for a 1 Torr level, a 10 Torr level, and a 100 Torr level vacuum gauge, in which a standard pressure gauge is installed within a pressure vessel for calibrating a vacuum gauge, the apparatus comprising:

a balance mounting shaft installed vertically within the pressure vessel and provided with a plurality of balance mounting bases spaced apart from one another at predetermined intervals along an axial direction, the balance mounting shaft being connected at a lower portion thereof to the standard pressure gauge;

a plurality of sets of balances mounted and supported on the balance mounting bases, each of said sets of balances being composed of a plurality of balances;

means for elevating one or more balance of the plurality of sets of balances from its respective balance mounting base or for arranging the balance on the balance mounting base; and means for controlling the operation of the elevating means based on commands received from outside.

2. The calibration apparatus according to claim 1, comprising five balance mounting bases, and five balance sets.

3. The calibration apparatus according to claim 2, wherein a first set of balances is composed of three balances having respective masses of 1 g, 9 g and 90 g.

4. The calibration apparatus according to claim 2, wherein a second set of balances is composed of three balances having respective masses of 2 g, 18 g, and 180 g.

5. The calibration apparatus according to claim 2, wherein a third set of balances is composed of three balances having respective masses of 4 g, 36 g, and 360 g.

6. The calibration apparatus according to claim 2, wherein a fourth set of balances is composed of three balances having respective masses of 8 g, 72 g, and 720 g.

7. The calibration apparatus according to claim 2, wherein a fifth set of balances is composed of three balances having respective masses of 3.332 g, 29.990 g, and 299.902 g.

8. The calibration apparatus according to claim 2, wherein a first set of balances is composed of three balances having respective masses of 1 g, 9 g and 90 g, a second set of balances is composed of three balances having respective masses of 2 g, 18 g, and 180 g, a third set of balances is composed of three balances having respective masses of 4 g, 36 g, and 360 g, a fourth set of balances is composed of three balances having respective masses of 8 g, 72 g, and 720 g, and a fifth set of balances is composed of three balances having respective masses of 3.332 g, 29.990 g, and 299.902 g.

9. The calibration apparatus according to claim 8, wherein the three balances of the respective balance sets are arranged in a descending order with regard to the gravity direction depending on respective masses.

10. The calibration apparatus according to claim 9, wherein the three balances of the respective balance sets are arranged in a descending order with regard to the gravity direction depending on respective diameters.

11. The calibration apparatus according to claim 8, wherein the three balances of the respective balance sets are arranged in a descending order with regard to the gravity direction depending on respective diameters.

12. The calibration apparatus according to claim 1, wherein the elevating means comprises:
a servo motor installed at the outside of the pressure vessel;
a rotary motion feed through respectively connected to at one side the servo motor for transferring the rotation force to the inside of the pressure vessel;
a plurality of lead screws, each of which connected vertically and mounted rotatably to the other side of the rotary motion feed through respectively;
a plurality of transporting heads, each of which is connected to a respective lead screw to move upwardly and downwardly according to the rotation of the lead screws; and
a plurality of arms installed around the balance mounting shaft to extend from each of the transporting heads to the sets of balances for elevating the balances selectively.

13. The calibration apparatus according to claim 12, wherein the servo motor comprises a step motor.

14. The calibration apparatus according to claim 12, wherein the servo motor comprises a brushless DC servo motor.

15. The calibration apparatus according to claim 12, further comprising means for detecting the lowest and the highest elevation amount of the elevating means, detected signals of the detecting means are transmitted to the control means, and the control means operates to stop the elevating means or actuate it continuously in response to the detected signals.

16. The calibration apparatus according to claim 15, wherein the detecting means comprises a first limit switch installed at a highest elevation height; a second limit switch installed at a lowest elevation height; and an indicator capable of reciprocating between the first and second limit switches in cooperation with the operation of the elevating means.

17. The calibration apparatus according to claim 12, wherein the balance mounting shaft is installed at center of the pressure vessel; and the lead screws are installed around the balance mounting shaft at equal intervals.

18. The calibration apparatus according to claim 1, wherein the standard pressure gauge comprises a cylinder fixed within the pressure vessel and connected at one end to gas supply means; and a piston which is installed at the inside of the cylinder in such a fashion as to move upwardly and downwardly, and on which at least one of the balances is located.

* * * * *